United States Patent [19]
Bernard

[11] Patent Number: 6,032,256
[45] Date of Patent: *Feb. 29, 2000

[54] POWER CONTROLLED COMPUTER SECURITY SYSTEM AND METHOD

[76] Inventor: Peter Andrew Bernard, 1138 Church St., San Francisco, Calif. 94114

[*] Notice: This patent issued on a continued prosecution application filed under 37 CFR 1.53(d), and is subject to the twenty year patent term provisions of 35 U.S.C. 154(a)(2).

[21] Appl. No.: 08/370,173

[22] Filed: Jan. 9, 1995

[51] Int. Cl.[7] .............................. H04L 9/00; G06F 11/00
[52] U.S. Cl. ............................ 713/200; 380/25
[58] Field of Search ................... 395/575; 380/4, 380/25, 52, 23, 49; 371/19, 68.3, 11.3; 364/222.5, 275.5, 286.4, 286.5, 285; 713/200, 201, 202; 714/3, 5, 37; 340/825.34

[56] References Cited

U.S. PATENT DOCUMENTS

| | | |
|---|---|---|
| 4,701,845 | 10/1987 | Andreasen et al. ............ 364/200 |
| 4,816,653 | 3/1989 | Anderl et al. ................. 235/380 |
| 4,942,606 | 7/1990 | Kaiser et al. ..................... 380/4 |
| 5,007,082 | 4/1991 | Cummins ........................ 380/4 |
| 5,283,828 | 2/1994 | Saunders et al. ................ 380/4 |
| 5,341,422 | 8/1994 | Blackledge, Jr. et al. ........ 380/4 |
| 5,359,660 | 10/1994 | Clark et al. .................... 380/25 |
| 5,377,269 | 12/1994 | Heptig et al. .................. 380/25 |
| 5,388,156 | 2/1995 | Blackledge, Jr. et al. ........ 380/4 |
| 5,402,492 | 3/1995 | Goodman et al. .............. 380/25 |
| 5,434,562 | 7/1995 | Reardon ..................... 340/825.34 |

Primary Examiner—Robert W. Beausoliel, Jr.
Assistant Examiner—Nadeem Iqbal
Attorney, Agent, or Firm—Foley & Lardner

[57] ABSTRACT

An I/O port locking computer security system is implemented in the power management module of the hardware-software interface program (BIOS). A hotkey sequence of keystrokes activates the portlock feature and a system management interrupt signal (SMI) is generated. A SMI handler routine receives the interrupt signal and generates a signal to a hardware device handler. The device handler receives the signal and then disables various data transfer I/O ports on the computer (e.g., serial, parallel, fax, modem, floppy drives, and infrared communication ports). I/O ports in the disabled state cannot be accessed. Thus, data in the computer cannot be transmitted, copied, or "beamed" via infrared, to an unauthorized system or medium. I/O ports in the disabled state are enabled after receiving a password and a SMI interrupt signal is generated. A SMI handler receives the interrupt signal and generates a signal to a hardware device handler. The device handler receives the signal and then enables various I/O ports on the computer. Enablement or disablement of the portlock feature, the hotkey keystroke sequence, and the password are maintained in CMOS computer memory. Such elements can be altered in the computer BIOS setup program.

16 Claims, 4 Drawing Sheets

POWER CONTROLLED COMPUTER SECURITY SYSTEM AND METHOD

BACKGROUND OF THE INVENTION

1. Field of the Invention

This invention relates generally to the field of computer security of personal computers and specifically to a computer security system and method that powers ON or OFF various input/output (I/O) ports of the computer system.

2. Background of the Invention

Personal computers generally have little or no data security protection and can be readily accessed by unauthorized individuals. Portable or notebook computers that are often used outside a secure workplace, present even more opportunity for unauthorized access. And, in order to facilitate data transfer between computers while away from the office or home, many computers are fitted with various types of connectors and I/O ports making such access simple. Serial ports, parallel ports, fax ports, modem ports, floppy drives, and infrared communication ports (e.g., such as that commercially available from Crystal Semiconductor or National Semiconductor, Santa Clara, Calif.) are now available for data transfer. The increase of on-line services and network gateways also increases the opportunity for unauthorized access and transfer of data on personal computers through various I/O ports.

Conventional computer security systems prevent access to the computer by enforcing a password during the booting process. However, many computers, especially notebook computers, use a power conservation or sleep mode that disables or modifies selected functions in order to reduce the power consumption the computer when not in use. Use of the computer can sometimes be resumed without re-booting, thereby bypassing a security system at boot time. More importantly, many of the I/O ports of the computer remain unsecured, and data on the computer can be accessed even if the computer is in "password" mode.

Another conventional security system prevents access to the system keyboard by using a password. However, many computer systems use alternative pointing devices, such as mice, in conjunction with graphical operating systems that can access data without using the keyboard. Thus, the keyboard security system is bypassed. Again, and more importantly, many I/O ports remain unsecured, and data on the computer can be accessed.

There is a need for a computer security system that can disable data access to the computer including I/O ports such as serial ports, parallel ports, fax ports, modem ports, floppy drives, and infrared communication ports, as well as the keyboard and mouse.

SUMMARY OF THE INVENTION

A port locking computer security system is implemented in the power management module of the hardware-software interface program (BIOS). A hotkey sequence of keystrokes activates the portlock feature and a system management interrupt (SMI) is generated. A SMI handler routine generates a signal to a hardware device handler. The device handler then powers OFF or disables data access or data transfer I/O ports on the computer. I/O ports in the OFF state cannot be accessed. Thus, data in the computer cannot be transmitted, copied, or "beamed" via infrared, to an unauthorized system or medium. The invention is particularly useful for the security of portable of notebook type computers.

Data I/O ports in the OFF state are reactivated after receiving a password and a SMI interrupt is generated. A SMI handler generates a signal to a hardware device handler. The device handler then powers ON various data transfer I/O ports on the computer.

Enablement and disablement of the portlock invention in the BIOS of the computer, hotkey verification, and password verification are maintained in CMOS computer memory. Such elements can be altered in the computer BIOS setup program.

DESCRIPTION OF THE PREFERRED EMBODIMENTS

Figure 1:
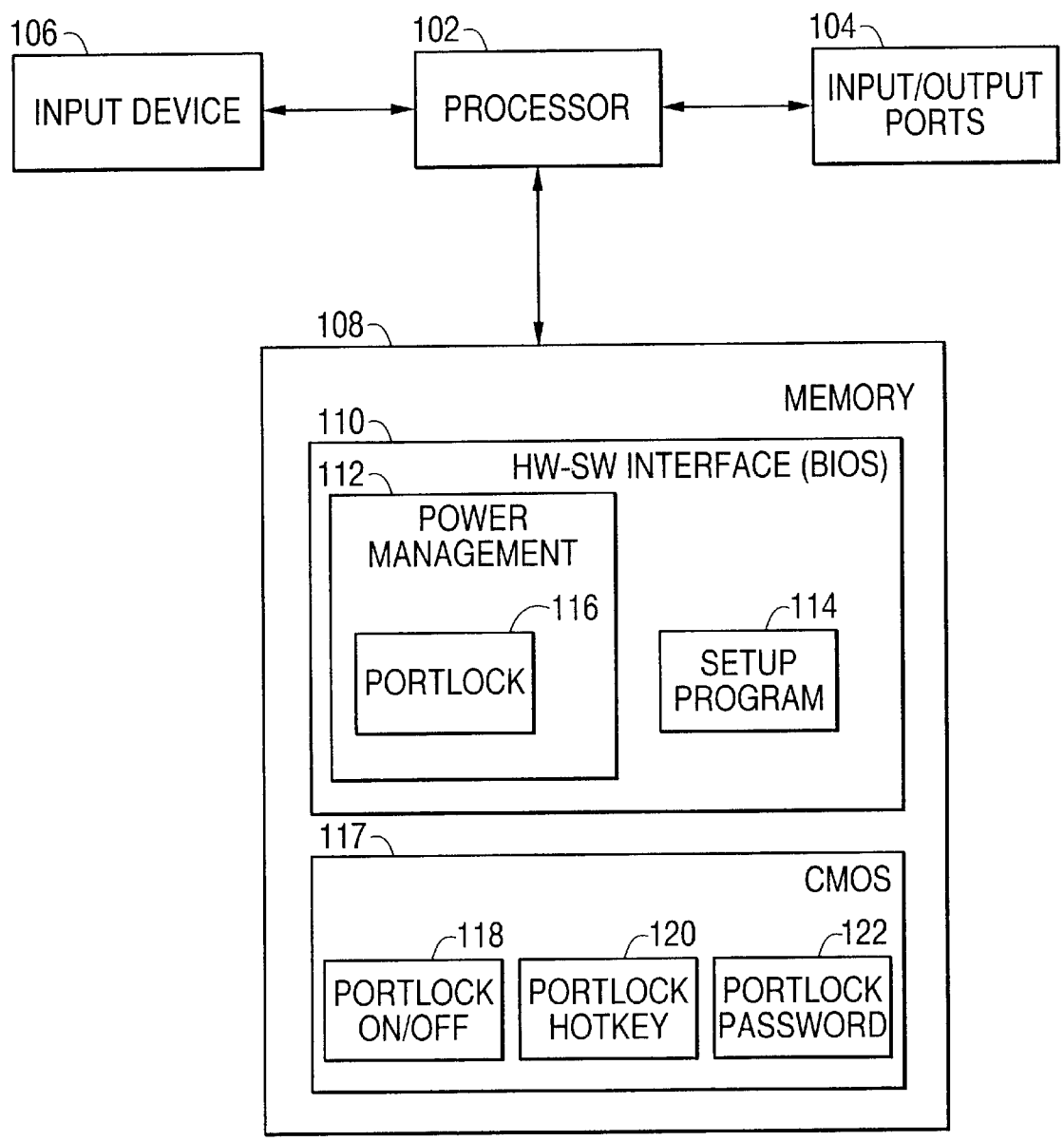
FIG. 1 is a simplified block diagram illustrating the portlocking computer security invention.

FIG. 1 shows a block diagram of software and hardware tools for implementing one embodiment of the present portlock invention 100. Computer system 100 may be any conventional computing system such as an IBM PC or compatible, a Macintosh, DEC, Sun, or Hewlett-Packard workstation, and the like. System 100 generally comprises a processor 102, one or more I/O ports 104, an input device 106, and memory 108. Processor 102 may be a central processing unit (CPU) (e.g., Intel 80386, 80486, Pentium1, Motorola 68020, 68030, RISC processor, SPARC processors and the like) or similar computer processing elements.

Data access or data transfer I/O ports 104 are communicatively coupled to processor 102 and may be serial ports, parallel ports, fax ports, modem ports, floppy drives, infrared communication ports, or other devices that facilitate the transfer of computer data from one computer or component to another computer or component. Such ports 104 are generally controlled by device handlers that are capable of turning power to the port ON or OFF, or otherwise enabling or disabling such ports. Device handlers are generally specific to the I/O device handled. Other input or output ports such as mouse ports, PS/2 ports, and/or keyboard ports may also be affected by the present invention.

Input device 106 is generally a keyboard, but may also be a mouse, touchscreen, or other similar input device or devices.

Memory 108 is coupled to processor 102 and comprises computer instructions that are executable on processor 102. Memory 108 may be any conventional computer memory such as random access memory (RAM) or read only memory (ROM). Memory 108 comprises a low-level software system, interrupt-handling, or basic input/output system (BIOS) 110 that facilitates communication between hardware and software elements of computer system 100. For example, BIOS 110 provides communication between software modules in memory 108 and I/O ports 104 via processor 102. BIOS 110 comprises power management program or module 112, and a setup program 114. In a preferred embodiment, BIOS 110 is NoteBIOS 4.0, commercially available from Phoenix Technologies, Santa Clara, Calif.

According to the present invention, power management module 112 comprises a portlock program or module 116. As described in detail below, portlock module 116 facilitates the enablement of I/O port 104 security to prevent unauthorized access. BIOS 110 also comprises setup program 114 that is used to change various settings and characteristics of computer system 100 including settings in BIOS 110 and other parts of memory 108.

Memory 108 also comprises a CMOS or DRAM section of memory 117. In a preferred embodiment, this area of memory 117 comprises portlock feature enablement/disablement setting 118 to activate or deactivate the present portlock invention in the BIOS of the computer. CMOS 117 also comprises portlock hotkey verification 120 that is used to verify receipt of the proper hotkey input sequence to activate the portlock feature, and portlock password verification 122 that is used verify the proper password input sequence to deactivate the portlock feature.

Figure 2:
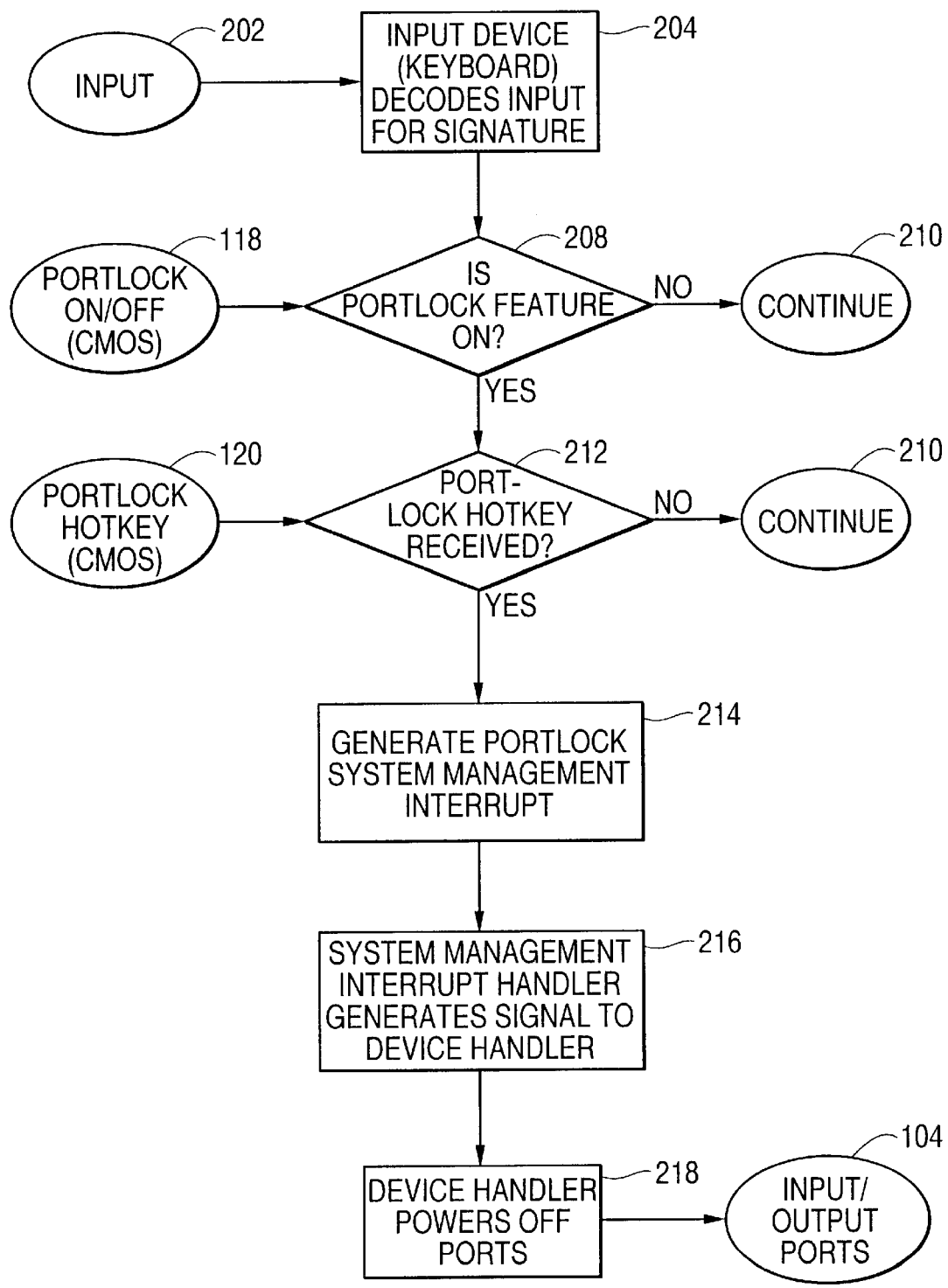
FIG. 2 is a flowchart illustrating the portlocking lock method.

FIG. 2 illustrates one embodiment of the portlocking lock procedure that may be implemented on system 100. Input 202 from a user is entered into an input device 106. In a preferred embodiment, input device 106 is a keyboard. Input device 106 conventionally decodes input 202 (e.g., keystrokes) to obtain a signature 204. The portlock feature of the present invention can be enabled or disabled in setup program 114, see FIG. 4. In a preferred embodiment, enablement, or disablement, of the portlock feature is recorded in CMOS 118. If the portlock feature is OFF 208, input 202 is processed in a conventional manner 210 by input device 106.

If the portlock feature is ON 208, a check is made to determine if the portlock "hotkey" key sequence input 202 was received 212. In a preferred embodiment, the portlock hotkey 120 can be established using setup program 114 and is recorded in CMOS 120. In a preferred embodiment, hotkey 120 is a multiple keystroke entry on a keyboard (e.g., <CTRL> <ALT> <L>). If portlock hotkey 120 was not received 212, input 202 is processed in a conventional manner 210 by input device 106.

If portlock hotkey 120 was received 212, a portlock system management interrupt is generated 214. A system management interrupt handler in BIOS 110 then generates a signal to a device handler 216 to indicate that power should be turned OFF (or otherwise disabled), to one or more data transfer I/O ports 104. Device handler then powers OFF or otherwise disables 218 I/O ports 104. In one embodiment all I/O ports are powered OFF 218. In another embodiment, various selected I/O ports are powered OFF. The selected I/O devices are selected by the user, for example, in setup program 114. In yet another embodiment, different hotkeys 120 turn OFF different selected I/O ports 104. I/O ports 104 can also otherwise be disabled 218, for example, disabling transmission of data.

Figure 3:
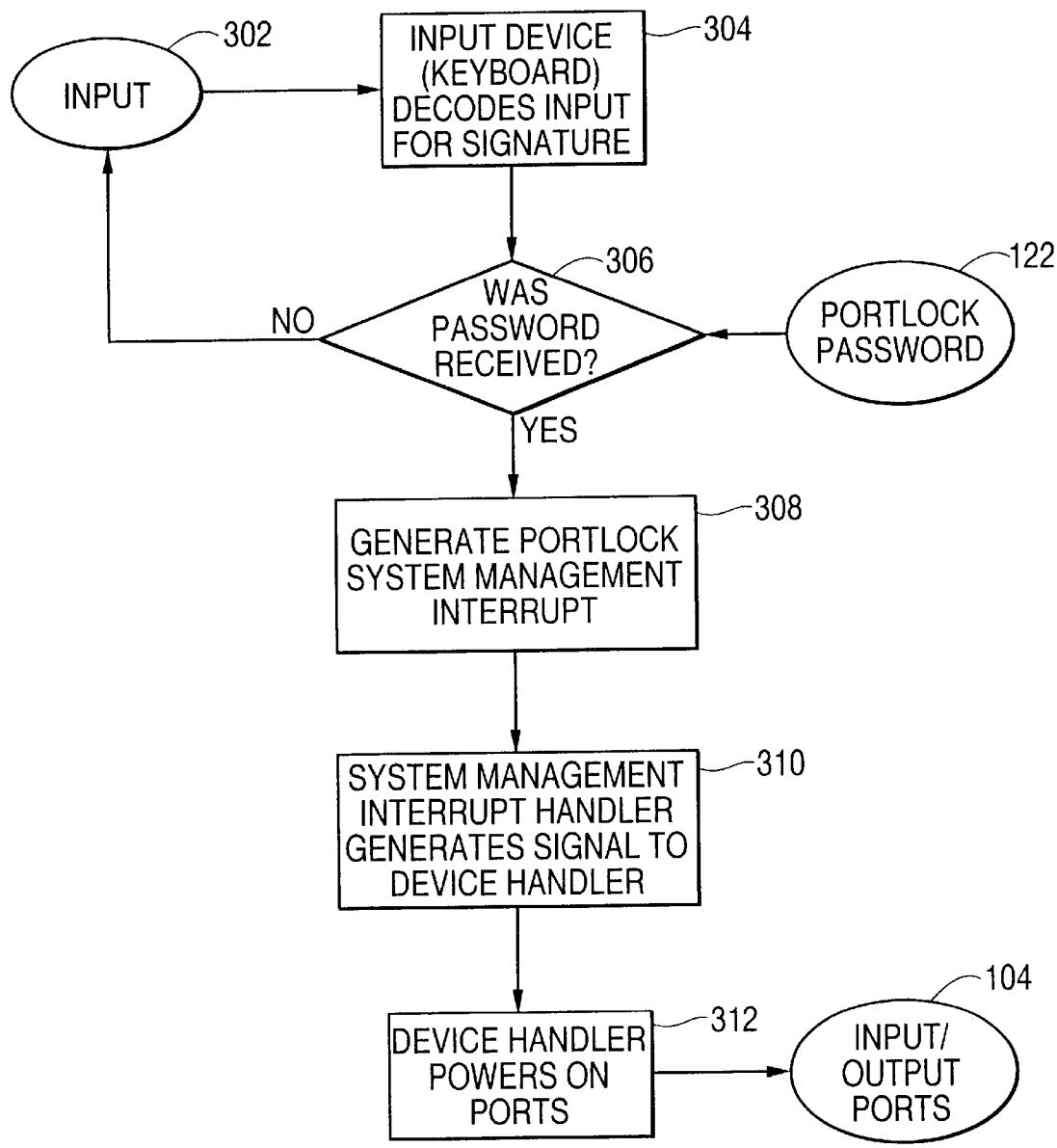
FIG. 3 is a flowchart illustrating the portlocking unlock method.

FIG. 3 illustrates one embodiment of the portlocking unlock procedure that may be implemented on system 100. Input 302 from a user is entered into an input device 106. In a preferred embodiment, input device 106 is a keyboard. Input device 106 conventionally decodes input 302 (e.g., keystrokes) to obtain a signature 304. If portlock password 122 is not received 306, access to the system 100 is not available and I/O ports 104 remain OFF or otherwise disabled. The user is returned to the input state 302. Portlock password 122 may be any set of keyboard characters or other computer input. In one embodiment, portlock password 122 is established in setup program 114, see FIG. 4. Alternatively, portlock password 122 can be established by executing portlock program 116 during normal operation of computer 100. In one embodiment, a record of failed attempts to access the system is recorded and can be reviewed by the user upon authorized access.

If portlock password 122 was received, a portlock system management interrupt is generated 308. A system management interrupt handler in BIOS 110 then generates a signal to a device handler 310 to indicate that power should be turned ON to one or more data transfer I/O ports 104. Device handler then powers ON or otherwise enables 312 I/O ports 104. In one embodiment, all I/O ports are powered ON 312. In another embodiment, various selected I/O ports are powered ON. The selected I/O devices are selected, for example, in setup program 114.

Figure 4:
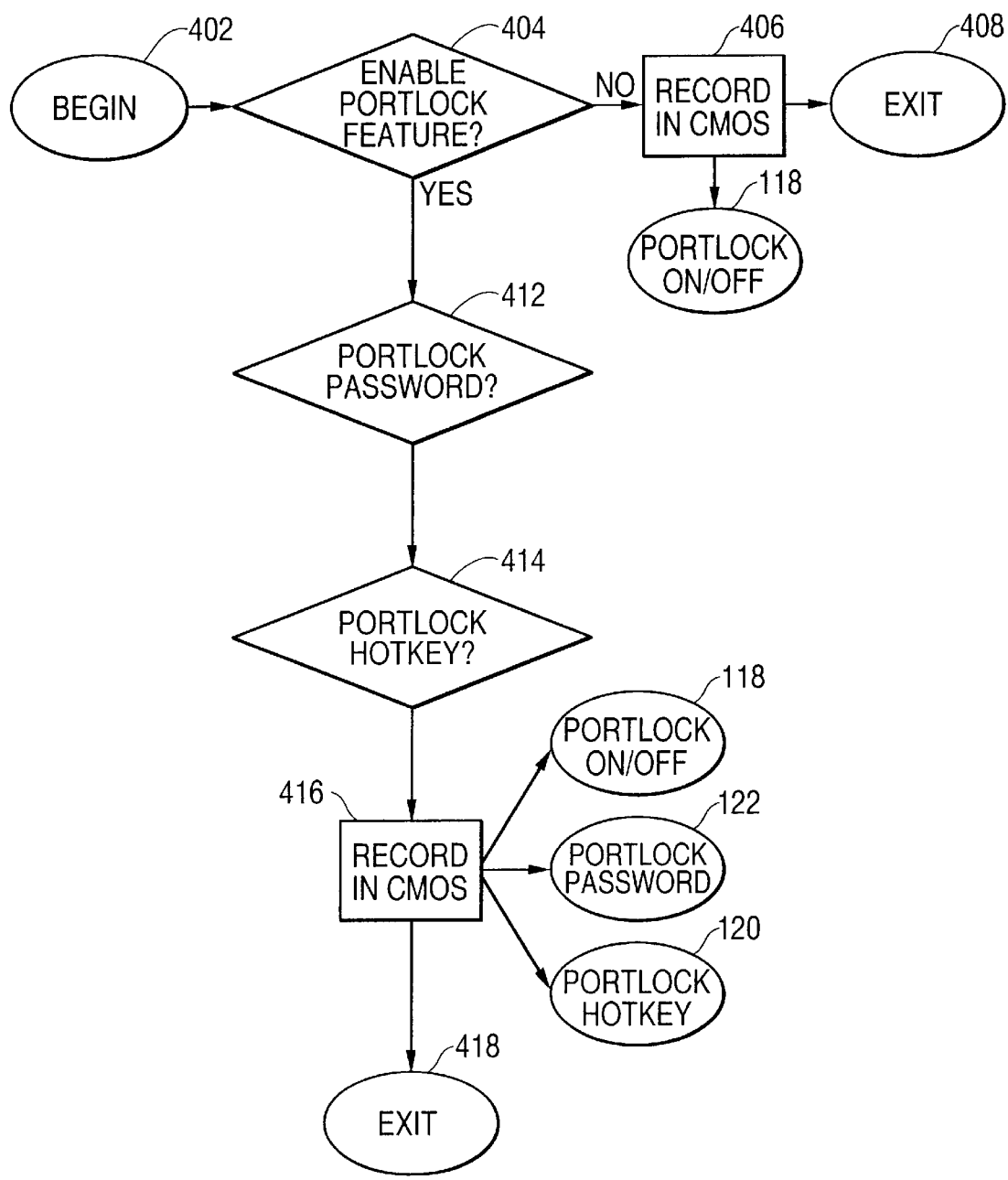
FIG. 4 is a flowchart illustrating the setting of the portlock enablement, password, and hotkey elements in the setup program.

FIG. 4 is a flowchart illustrating the setting of portlock enablement 118, password 122, and hotkey 120 features of the present invention. In a preferred embodiment, these features are accessible, and modifiable, via setup program 114 in BIOS 110. Alternatively, the features are accessible, and modifiable, via portlock program 116 in BIOS 110 or other program modules. Setup program 114 is conventionally entered, for example at startup or system boot 402. During execution of setup program 114, a query is made to enable or disable the portlock feature of the present invention 404. If the user chooses not to enable portlocking, a flag is set in CMOS 406, and this portion of setup is ended 408. If the user chooses to enable portlocking 404, a query is made for a password 412, and a hotkey 414, as used and described above. The enabled portlock 118, password 122, and hot key 120 are recorded in CMOS 416, and this portion of setup program 114 is ended 418.

What is claimed is:

1. In a computer comprising a processor, a memory having a BIOS portion, an input device, and one or more data transfer ports, a method implemented in BIOS for disabling at least one of the one of more data transfer ports, the method comprising the steps of:

inputting, at any time during an ON state of the computer, a sequence to the processor via the input device, the input sequence including only control characters;

generating a first signal, via the processor, in response to the input sequence; and disabling, via the processor, said at least one of the one or more data transfer ports in response to the first signal;

wherein the memory has a hotkey sequence stored therein, and the processor comprises a system interrupt handler, and wherein the step of generating a first signal comprises the steps of:

determining if the input sequence matches the hotkey sequence stored in the memory;

generating an interrupt signal, via the processor in response to the determining step; and generating, via the system interrupt handler, a device signal to disable said at least one of the one or more data transfer ports in response to the interrupt signal, wherein the input sequence is capable of being inputted via the input device during a boot operation of the computer and during a post-boot, normal operation of the computer, so as to result in either case in the disabling of the one or more data transfer ports without having to reboot the computer.

2. The method of claim 1 wherein an infrared communication data transfer port is disabled in response to the first signal.

3. The method of claim 1 wherein selected data transfer ports are disabled in response to the first signal.

4. The method of claim 1, further comprising the steps of:

inputting a password to the processor via the input device;

generating a second signal via the processor in response to the input password; and enabling the one or more data transfer ports in response to the second signal.

5. In a computer comprising a processor, a memory having a BIOS portion, an input device, and one or more data transfer ports, a method implemented in BIOS for enabling at least one of the one or more data transfer ports, the method comprising the steps of:

inputting, at any time during an ON state of the computer, a password to the processor via the input device;

comparing the input password to a password stored in a writable portion of the memory;

generating a first signal via the processor when the input password matches the stored password; and enabling, via the processor, said at least one of the one or more data transfer ports in response to the first signal.

6. The method of claim 5 wherein the processor comprises a system interrupt handler, and the step of generating a first signal comprises the steps of:

generating an interrupt signal, via the processor, in response to the matching of the stored password and the input password; and generating, via the system interrupt handler, a device signal to enable said at least one of the one or more data transfer ports in response to the interrupt signal.

7. The method of claim 5 wherein an infrared communication data transport is enabled in response to the first signal.

8. The method of claim 5 wherein only a subset of the data transfer ports are enabled in response to the first signal.

9. In a computer comprising a processor, a system interrupt handler, an input device, a memory storing a hotkey sequence, a password, and including a BIOS portion, and one or more data transfer ports, a method implemented in BIOS for enabling or disabling at least one of the one or more data transfer ports, the method comprising the steps of:

for disabling, inputting a first sequence to the processor via the input device at any time during an ON state of the computer, the first sequence corresponding to a keyboard-entered sequence of only control characters;

determining if the first sequence matches the hotkey sequence stored in the memory;

generating a first interrupt signal, via the processor, to disable at least one of the one or more data transfer ports in response to the first sequence determining step;

generating, via the system interrupt handler, a device signal to power OFF the one or more data transfer ports in response to the first interrupt signal; and for enabling, inputting a second sequence to the processor via the input device the second sequence corresponding to a keyboard-entered sequence of at least one of alphabetic characters and numeric characters, but not control characters;

determining if the second sequence matches the password stored in the memory;

generating a second interrupt signal via the processor to enable at least one of the one or more data transfer ports in response to the second sequence determining step;

generating, via the system interrupt handler, a device signal to power ON said at least one of the one or more data transfer ports in response to the second interrupt signal; and powering ON said at least one of the one or more data transfer ports in response to the device signal.

10. A computer system having a portlock program comprising the steps of claim 1 implemented in a basic input output system (BIOS) portion of the memory.

11. A computer system having a portlock program comprising the steps of claim 5 implemented in a basic input output (BIOS) portion of memory.

12. A computer system with securable data transfer ports, the system comprising:

a processor for executing programmed instructions;

a memory, coupled to the processor, for storing a hotkey, a password, and program instructions for execution by the processor and having a BIOS portion;

an input device, coupled to the processor, for accepting input from a user at any time during an ON state of the computer system;

one or more data transfer ports, coupled to the processor; and a portlock program, stored in the BIOS and executable on the processor, for generating a first signal to disable at least one of the one or more data transfer ports in response to the hotkey being received via the input device, and for generating a second signal to enable at least one of the one or more data transfer ports in response to the password being received via the input device.

13. The computer system of claim 12, wherein at least one of the one or more data transfer ports are infrared communication ports.

14. The computer system of claim 12 wherein only a subset of the data transfer ports are disabled in response to the hotkey being received and where the subset of the data transfer ports are enabled in response to the password being received.

15. The computer system of claim 12, wherein the portlock program is located in a power management portion of the BIOS portion of the memory.

16. The method of claim 5, further comprising a step of counting a number of unsuccessful comparisons made in the comparing step before a successful comparison has been made; and providing, via a display to a user that has been provided access to the computer via the successful comparison, the number of unsuccessful comparisons.

* * * * *